United States Patent
Wang

(10) Patent No.: US 11,827,224 B2
(45) Date of Patent: Nov. 28, 2023

(54) VEHICLE CONTROL METHOD AND APPARATUS, VEHICLE, AND STORAGE MEDIUM

(71) Applicant: BEIJING BAIDU NETCOM SCIENCE TECHNOLOGY CO., LTD., Beijing (CN)

(72) Inventor: Ruisuo Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 243 days.

(21) Appl. No.: 17/207,374

(22) Filed: Mar. 19, 2021

(65) Prior Publication Data

US 2021/0206378 A1    Jul. 8, 2021

(30) Foreign Application Priority Data

Sep. 24, 2020   (CN) .......................... 202011018900.0

(51) Int. Cl.
    *B60W 30/18*      (2012.01)
    *B60W 30/12*      (2020.01)
    (Continued)

(52) U.S. Cl.
    CPC ..... *B60W 30/18163* (2013.01); *B60Q 1/5035* (2022.05); *B60W 30/12* (2013.01);
    (Continued)

(58) Field of Classification Search
    CPC ........................ B60W 30/18163; G06V 20/597
    See application file for complete search history.

(56) References Cited

U.S. PATENT DOCUMENTS 9,550,528 B1    1/2017   Hakeem
10,095,688 B1 *   10/2018   Schilling ................ H04L 51/06
(Continued)

FOREIGN PATENT DOCUMENTS

CN     103373276 B     10/2013
CN     104960524 A     10/2015
(Continued)

OTHER PUBLICATIONS

First Office Action of the parallel application KR10-2021-0026284.
(Continued)

*Primary Examiner* — Jess Whittington
(74) *Attorney, Agent, or Firm* — J.C. PATENTS

(57) ABSTRACT

Embodiments of the present application disclose a vehicle control method, an apparatus, a vehicle, an electronic device and a storage medium, which relate to automatic driving technology. The method includes: outputting a prompt message, where the prompt message is used for prompting an intention of lane changing of a host vehicle to a surrounding vehicle, and the surrounding vehicle is a vehicle having a potential influence on the lane changing of the host vehicle; determining first driving state prediction information of the surrounding vehicle, where the first driving state prediction information is related to a feedback on the prompt message; generating and executing a first driving strategy according to the first driving state prediction information, where the first driving strategy includes lane-changing driving or driving within the current lane.

20 Claims, 7 Drawing Sheets

(51) Int. Cl.
    *B60W 40/08*     (2012.01)
    *B60W 50/00*     (2006.01)
    *G08G 1/16*     (2006.01)
    *G06V 20/56*     (2022.01)
    *G06V 20/59*     (2022.01)
    *G06F 18/214*     (2023.01)
    *B60Q 1/50*     (2006.01)

(52) U.S. Cl.
    CPC ........ *B60W 40/08* (2013.01); *B60W 50/0097* (2013.01); *G06F 18/214* (2023.01); *G06V 20/588* (2022.01); *G06V 20/597* (2022.01); *G08G 1/167* (2013.01); *B60W 2540/223* (2020.02); *B60W 2554/4042* (2020.02)

(56) References Cited

U.S. PATENT DOCUMENTS

| | | | |
|---|---|---|---|
| 2015/0191178 A1* | 7/2015 | Roy | H04W 4/027 |
| | | | 701/36 |
| 2016/0001781 A1* | 1/2016 | Fung | G07C 9/37 |
| | | | 701/36 |
| 2020/0290621 A1 | 9/2020 | Kwan | |
| 2020/0406892 A1* | 12/2020 | Yu | G06V 20/588 |
| 2021/0064060 A1* | 3/2021 | Park | G06Q 20/145 |

FOREIGN PATENT DOCUMENTS

| | | |
|---|---|---|
| CN | 106530833 A | 3/2017 |
| CN | 106710267 A | 5/2017 |
| CN | 106997690 A | 8/2017 |
| CN | 109445428 A | 3/2019 |
| CN | 109448409 A | 3/2019 |
| CN | 110852281 A | 2/2020 |
| DE | 102012023361 A1 | 5/2014 |
| EP | 3648076 A1 | 5/2020 |
| JP | 2002307973 A | 10/2002 |
| JP | 2009280015 A | 12/2009 |
| JP | 2020004378 A | 1/2020 |
| KR | 20140003250 | 5/2014 |
| WO | WO2014082698 | 6/2014 |
| WO | WO2020075961 A1 | 4/2020 |

OTHER PUBLICATIONS

The Extended European Search Report of EP211676580.
Office Action of the parallel application JP2021-068818.
Notice of Allowance of the parallel application KR10-2021-0026284.

* cited by examiner

VEHICLE CONTROL METHOD AND APPARATUS, VEHICLE, AND STORAGE MEDIUM

CROSS-REFERENCE TO RELATED APPLICATION

This application claims priority to Chinese Patent Application No. 202011018900.0, filed on Sep. 24, 2020, which is hereby incorporated by reference in its entirety.

TECHNICAL FIELD

The present application relates to automatic driving technology and, in particular to a vehicle control method, an apparatus, a vehicle, an electronic device and a storage medium.

BACKGROUND

With the popularization of vehicles and the continuous development of the related art, how to improve safe driving of vehicles has become an urgent problem to be solved, and safe lane changing is an important part of the safe driving.

In the prior art, a vehicle generally determines whether to change a lane according to whether the current distance for lane changing can satisfy a lane changing behavior of the vehicle. For example, by presetting a distance for safe lane changing, if the current distance for lane changing is greater than the distance for safe lane changing, it is considered that lane changing can be completed.

SUMMARY

A vehicle control method for improving safe driving of a vehicle, an apparatus, a vehicle, an electronic device and a storage medium are provided.

According to a first aspect, a vehicle control method is provided, including:
  outputting a prompt message, where the prompt message is used for prompting an intention of lane changing of a host vehicle to a surrounding vehicle, and the surrounding vehicle is a vehicle having a potential influence on the lane changing of the host vehicle;
  determining first driving state prediction information of the surrounding vehicle, where the first driving state prediction information is related to a feedback on the prompt message;
  generating and executing a first driving strategy according to the first driving state prediction information, where the first driving strategy includes lane-changing driving or driving within a current lane.

In this embodiment, by determining the first driving state prediction information according to the feedback related to the prompt message, and generating and executing the first driving strategy based on the first driving state prediction information, improvement of safety and reliability of lane changing of the vehicle can be realized, and thus a technical effect of improving safe and reliable driving of the vehicle can be realized.

According to a second aspect, an embodiment of the present application provides a vehicle control apparatus, including:
  an output module, configured to output a prompt message, where the prompt message is used for prompting an intention of lane changing of a host vehicle to a surrounding vehicle, and the surrounding vehicle is a vehicle having a potential influence on the lane changing of the host vehicle;
  a first determination module, configured to determine first driving state prediction information of the surrounding vehicle, where the first driving state prediction information is related to a feedback on the prompt message;
  a first generating module, configured to generate a first driving strategy according to the first driving state prediction information, where the first driving strategy includes lane-changing driving or driving within the current lane;
  a first execution module, configured to execute the first driving strategy.

According to a third aspect, an embodiment of the present application provides a vehicle, including the vehicle control apparatus described in the above embodiment.

According to a fourth aspect, an embodiment of the present application provides an electronic device, including:
  at least one processor; and
  a memory communicatively connected with the at least one processor; where,
    the memory stores instructions executable by the at least one processor, and the instructions are executed by the at least one processor to enable the at least one processor to execute the method described in any one of the above embodiments.

According to a fifth aspect, an embodiment of the present application provides a non-transitory computer-readable storage medium storing computer instructions, where the computer instructions are used for causing a computer to execute the method described in any one of the above embodiments.

The present application provides a vehicle control method, an apparatus, a vehicle, an electronic device and a storage medium. The method includes: outputting a prompt message, where the prompt message is used for prompting an intention of lane changing of a host vehicle to a surrounding vehicle, and the surrounding vehicle is a vehicle having a potential influence on the lane changing of the host vehicle; determining first driving state prediction information of the surrounding vehicle, where the first driving state prediction information is related to a feedback on the prompt message; generating and executing a first driving strategy according to the first driving state prediction information, where the first driving strategy includes lane-changing driving or driving within the current lane. In the embodiments of the present application, by outputting the prompt message and determining the first driving state prediction information based on the feedback on the prompt message, so as to know whether the surrounding vehicle supports the lane changing of the host vehicle and then to generate and execute the first driving strategy, at least one of disadvantages of a lane changing failure and a safety accident caused by a change of a driving strategy of the surrounding vehicle in the related art can be avoided, and the technical effect of improving the safety and reliability of lane changing is realized.

It should be understood that what is described in this section is not intended to identify key or important features of embodiments of the present application, nor is it intended to limit the scope of the present application. Other features of the present application will become easy to be understood from the following description.

BRIEF DESCRIPTION OF DRAWINGS

The accompanying drawings are used for a better understanding of the solutions and do not constitute a limitation to the present application, in which.

DESCRIPTION OF EMBODIMENTS

Illustrative embodiments of the embodiments of the present application will be described below with reference to accompanying drawings, where various details of the embodiments of the present application are included to facilitate understanding, and should be considered as merely illustrative. Therefore, it should be recognized by those of ordinary skill in the art that various changes and modifications can be made to the embodiments described here without departing from the scope and spirit of the embodiments of the present application. Also, for clarity and conciseness, descriptions of well-known functions and structures are omitted in the following description.

Figure 1:
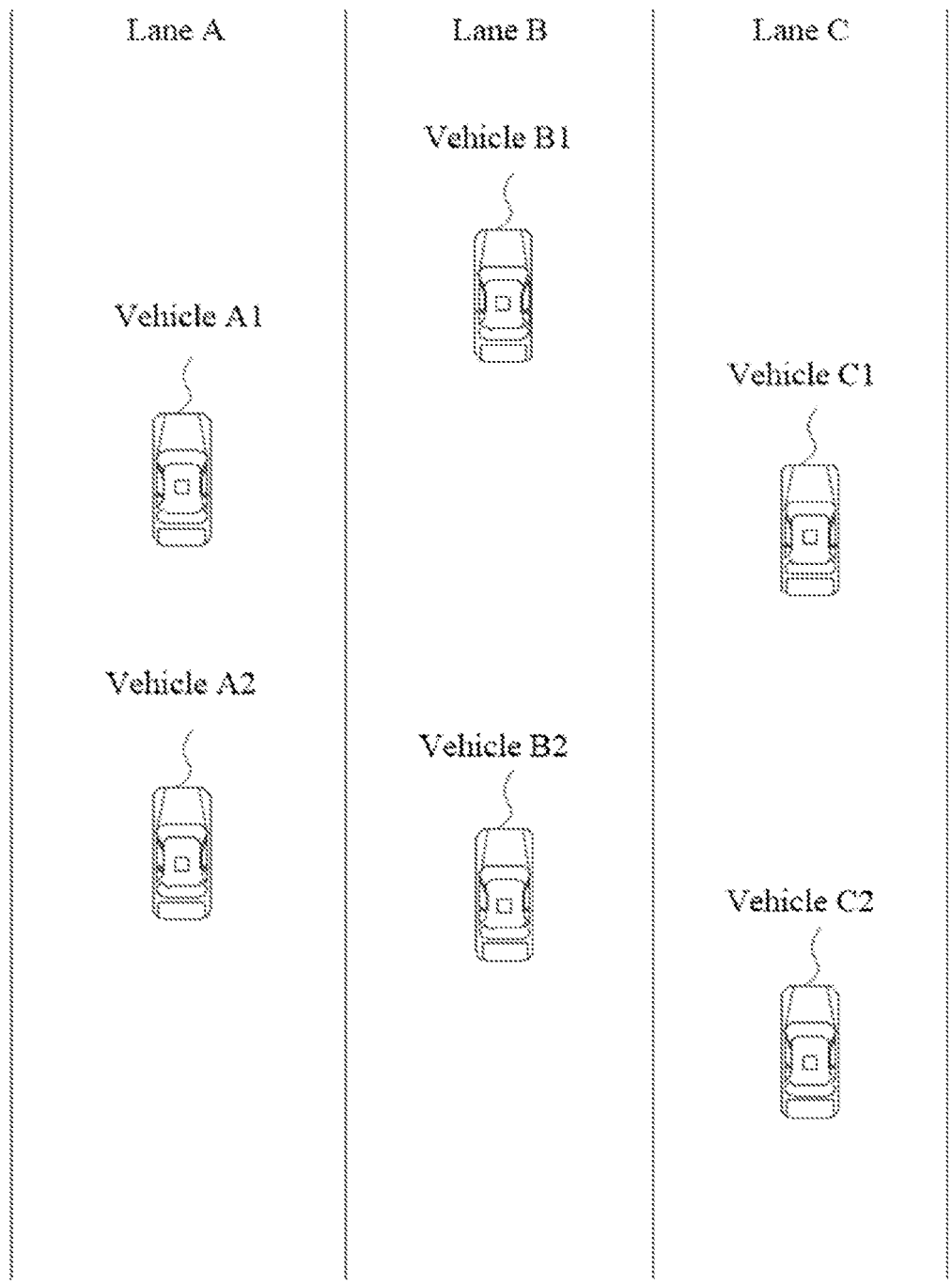
FIG. 1 is a schematic diagram of an application scenario of a vehicle control method according to an embodiment of the present application.

Please refer to FIG. 1, FIG. 1 is a schematic diagram of an application scenario of a vehicle control method according to an embodiment of the present application.

The application scenario shown in FIG. 1 includes a plurality of vehicles travelling on a road, specifically vehicles A1 and A2 travelling on lane A, vehicles B1 and B2 travelling on lane B, and vehicles C1 and C2 travelling on lane C.

It should be understood that, FIG. 1 is only used for illustratively explaining a possible suitable application scenario of this embodiment, and cannot be understood as a limitation to the application scenario of this embodiment.

For example, in some embodiments, elements in FIG. 1 can be increased correspondingly, such as an increase of vehicles, an increase of lanes and an increase of surrounding facilities (such as a roadside unit, a traffic light and a camera apparatus, etc.).

For another example, in other embodiments, the elements in FIG. 1 can be reduced correspondingly, such as a reduction of vehicles, a reduction of lanes, etc.

It should be understood that, during a travelling process of a vehicle, a driving strategy of the vehicle may change, where the driving strategy can be used for representing at least one of information of speed and direction dimensions of the vehicle. For example, the driving strategy can include decelerating driving, accelerating driving, and lane-changing driving, etc. For example, in FIG. 1, vehicle A2 can change a lane from lane A to lane B, and can continue to change the lane from lane B to lane C, and so can other vehicles, of which no more examples will be listed here.

It is worth noting that, in the related art, in order to realize safety of lane changing of vehicles, for example, in order to ensure that vehicle A2 avoids a collision with a vehicle in lane B (at least one of vehicles B1 and B2) during a process of lane changing of vehicle A2, vehicle A2 can determine a distance between vehicle B1 and vehicle B2 in advance before vehicle A2 changes a lane from lane A to lane B, where the distance can be called a distance for lane changing of vehicle A2, and can compare the distance with a preset distance for safe lane changing. If the distance is greater than the distance for safe lane changing, it means that there is relatively enough space between vehicle B1 and vehicle B2 to support the lane changing of vehicle A2, then vehicle A2 can execute an operation of lane changing.

However, a driving strategy of any vehicle may change, that is, switching from one driving strategy to another. As shown in FIG. 1, vehicle B1 may change from constant-speed driving to decelerating driving, and vehicle B2 may change from decelerating driving to accelerating driving, and so on. In addition, when driving strategies of some vehicles change, vehicle A2 may be led to a failure of changing the lane, and even worse, a traffic accident may be caused.

For example, when vehicle B1 changes from the constant-speed driving to the decelerating driving, a rear-ending traffic accident of vehicle A2 with vehicle B1 during the process of the lane changing of vehicle A2 may be caused; for another example, when vehicle B2 changes from the decelerating driving to the accelerating driving, a traffic accident of vehicle B2 colliding with vehicle A2 during the process of the lane changing of vehicle A2 may be caused.

After creative effort, the inventor of the present application acquires the inventive concept of the present application: a host vehicle (such as vehicle A2 in the above embodiment) outputs a prompt message to inform other vehicles (such as other vehicles except vehicle A2 in the above embodiment) of its intention of lane changing, and predicts whether the other vehicles support the lane changing of the host vehicle according to the other vehicles and a feedback from a driver of at least one of the other vehicles.

The technical solutions of the present application and how the technical solutions of the present application solve the above technical problems will be described in detail with specific embodiments below. The following several specific embodiments can be combined with each other, and the same or similar concepts or processes may not be repeated in some embodiments. Embodiments of the present application will be described below with reference to accompanying drawings.

According to one aspect of the embodiments of the present application, an embodiment of the present application provides a vehicle control method, which is applied to automatic driving technology in the field of artificial intelligence to realize safety and reliability of automatic driving of vehicles.

Figure 2:
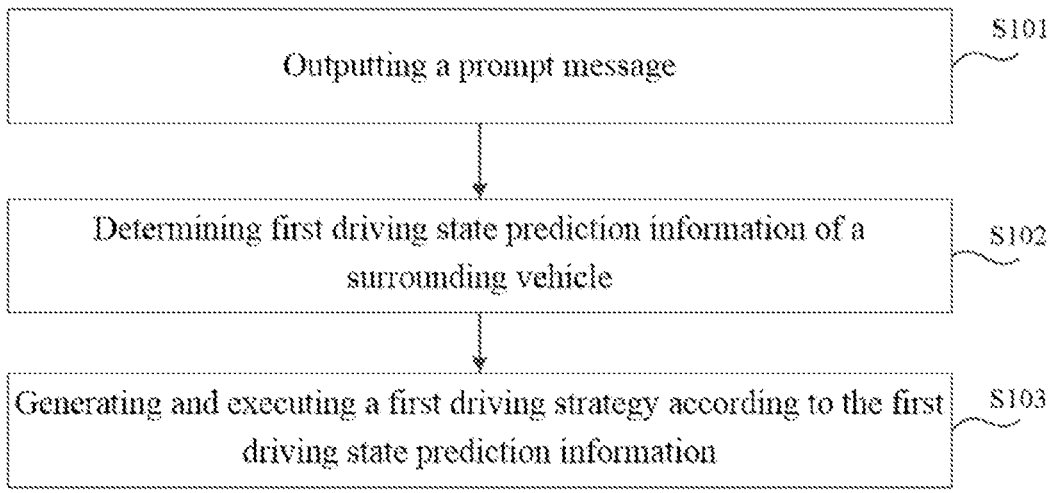
FIG. 2 is a schematic flowchart of a vehicle control method according to an embodiment of the present application.

Please refer to FIG. 2, FIG. 2 is a schematic flowchart of a vehicle control method according to an embodiment of the present application.

As shown in FIG. 2, the method includes:

S101: outputting a prompt message, where the prompt message is used for prompting an intention of lane changing of a host vehicle to a surrounding vehicle, where the surrounding vehicle is a vehicle having a potential influence on the lane changing of the host vehicle.

An executive body of the present application can be a vehicle control apparatus. The vehicle control apparatus may be a processor, a controller, a server, a vehicle-mounted terminal and the like provided in the host vehicle, and the host vehicle may be an automatic driving vehicle. In this embodiment, a specific form of the vehicle control apparatus is not limited as well as an automatic level of the automatic driving vehicle.

A description of the prompt message is as follows.

In a possible implementation, turn signal lamps may be disposed at the rear of the host vehicle, including a turn signal lamp disposed on the left side of the host vehicle and a turn signal lamp disposed on the right side of the host vehicle, and prompt messages are output through the turn signal lamps. For example, an intention of changing a lane to a left lane of the host vehicle is output through the turn signal lamp on the left side of the host vehicle; for example, an intention of changing the lane to a right lane of the host vehicle is output through the turn signal lamp on the right side of the host vehicle.

In another possible implementation, a display apparatus may be disposed at the rear of the host vehicle, and a prompt message is output through the display apparatus. For example, "Please pay attention, the vehicle is turning left" is displayed on the display apparatus, so as to output the intention of changing the lane to the left lane of the host vehicle; for another example, "Please pay attention, the vehicle is turning right" is displayed on the display apparatus, so as to output the intention of changing the lane to the right lane of the host vehicle.

It should be understood that, the above displayed text information is only used for illustratively explaining possible forms and contents of outputting the prompt message of the vehicle control apparatus, which cannot be understood as a limitation to the forms and contents of outputting the prompt message.

In addition, the display apparatus may be a liquid crystal display (LCD), a light emitting diode (LED) display apparatus, an organic light emitting diode (OLED) display apparatus, etc., which is not limited in the embodiments of the present application.

In another possible implementation, an indicator light (commonly known as headlight) may be disposed at the front of the host vehicle, and the vehicle control apparatus outputs the intention of the lane changing of the host vehicle by controlling flashing of the indicator light.

In another possible implementation, the host vehicle may be provided with a speaker (commonly known as a horn), and the vehicle control apparatus outputs the intention of the lane changing of the host vehicle by controlling the speaker.

It should be understood that, the above description about the prompt message is only used for illustratively describing the content of the prompt message, which cannot be understood as a limitation to the content of the prompt message.

The surrounding vehicle can be a vehicle located in the same lane as the host vehicle, or a vehicle located in a different lane from the host vehicle. A certain vehicle can be called a surrounding vehicle if it can influence the lane changing of the host vehicle.

For example, in combination with the application scenario shown in FIG. 1, when the host vehicle in this embodiment is vehicle A2, vehicles A1, B1, B2 and C1 may all influence the lane changing of vehicle A2. For example, if vehicle A1 is in lane-changing driving, then vehicle A2 may be unable to complete the lane changing; for another example, if vehicle B1 is in decelerating driving, a collision between vehicle A2 and vehicle B1 may be caused. Therefore, vehicles A1, B1, B2 and C1 can be called surrounding vehicles. However, accelerating driving or decelerating driving o vehicle C2 will not influence the lane changing of vehicle A2, so vehicle C2 is not included in the surrounding vehicles.

S102: determining first driving state prediction information of the surrounding vehicle, where the first driving state prediction information is related to a feedback on the prompt message.

If the surrounding vehicle receives the prompt message, a feedback may be made on the prompt message, such as changing its driving strategy, etc. The first driving state prediction information can be understood as relevant information about whether the surrounding vehicle supports the lane changing of the host vehicle, where the information is obtained by making a prediction by the vehicle control apparatus for the feedback on the prompt message.

For example, in combination with the above description and the application scenario shown in FIG. 1, the vehicle control apparatus controls vehicle A1 (i.e., the host vehicle) to output the prompt message. For the prompt message, a driving strategy of vehicle B2 (i.e., the surrounding vehicle) may change (i.e., a feedback of vehicle B2 on the prompt message), and the vehicle control apparatus can predict whether vehicle B2 supports the lane changing of the host vehicle according to the change.

It is worth noting that, in this embodiment, after outputting the prompt message, the vehicle control apparatus determines the first driving state prediction information based on the feedback for the prompt message, so as to determine whether the surrounding vehicle supports the lane changing of the host vehicle, thus avoiding a problem in the related art that a traffic accident is caused by direct lane changing based on a space for lane changing when the driving strategy of a surrounding vehicle changes, and improving the safety and reliability of lane changing.

S103: generating and executing a first driving strategy according to the first driving state prediction information, where the first driving strategy includes lane-changing driving or driving within a current lane.

That is to say, when the vehicle control apparatus determines whether the surrounding vehicle supports the lane changing of the host vehicle, the vehicle control apparatus can generate the corresponding first driving strategy. For example, if the vehicle control apparatus determines that the surrounding vehicle supports the lane changing of the host vehicle, the vehicle control apparatus can generate a first driving strategy used for indicating the lane-changing driving and execute an operation of lane-changing driving; for another example, if the vehicle control apparatus determines that the surrounding vehicle does not support the lane changing of the host vehicle, the vehicle control apparatus can generate a first driving strategy used for indicating driving within the current lane and execute an operation of driving within the current lane.

It can be seen based on the above analysis that, the embodiments of the present application provide a vehicle control method. The method includes: outputting a prompt message, where the prompt message is used for prompting an intention of lane changing of a host vehicle to a surrounding vehicle, and the surrounding vehicle is a vehicle having a potential influence on the lane changing of the host vehicle; determining first driving state prediction information of the surrounding vehicle, where the first driving state prediction information is related to a feedback on the prompt message; generating and executing a first driving strategy according to the first driving state prediction information, where the first driving strategy includes lane-changing driving or driving within the current lane. In the embodiments of the present application, by outputting the prompt message and determining the first driving state prediction information based on the feedback on the prompt message, so as to know whether the surrounding vehicle supports the lane changing of the host vehicle and then to generate and execute the first driving strategy, at least one of disadvantages of a lane changing failure and a safety accident caused by a change of a driving strategy of the surrounding vehicle in the related art can be avoided, and a technical effect of improving safety and reliability of lane changing is realized.

It can be seen in combination with the above analysis that, the surrounding vehicle may change its driving strategy after receiving the prompt message output by the vehicle control apparatus, and the change of its driving strategy can be understood as the feedback of the surrounding vehicle for the prompt message. The feedback for the prompt message can be understood from two dimensions, one dimension is a driver dimension and the other dimension is a control dimension of a driving strategy of the surrounding vehicle.

That is, in some embodiments, the first driving state prediction information includes: at least one of first prediction information determined based on driver information and second prediction information determined based on a driving record.

That is, the first driving state prediction information may include the first prediction information, or include the second prediction information, or include the first prediction information and the second prediction information.

When the driving state information includes the first prediction information, it can be understood as information about whether a driver who is driving the surrounding vehicle supports the lane changing of the host vehicle, where the information is obtained by making a prediction by the vehicle control apparatus based on relevant information of the driver.

When the driving state information includes the second prediction information, it can be understood as information about whether the surrounding vehicle supports the lane changing of the host vehicle, where the information is obtained by making a prediction by the vehicle control apparatus based on the driving record of the surrounding vehicle.

When the driving state information includes the first prediction information and the second prediction information, it can be understood as information about whether the surrounding vehicle supports the lane changing of the host vehicle, where the information is obtained by making a prediction by the vehicle control apparatus based on the relevant information of the driver and the driving record of the surrounding vehicle.

It is worth noting that, in this embodiment, the first driving state prediction information includes at least one of the first prediction information and the second prediction information, and the first prediction information is determined based on the driver information and the second prediction information is determined based on the driving record, which can improve reliability and accuracy of determining the first driving state prediction information, and thus improve the safety of lane changing of the host vehicle.

Especially when the first driving state prediction information includes the first prediction information and the second prediction information, which is equivalent to interpreting the first driving state prediction information from different dimensions, the safety of lane changing of the host vehicle is further improved, and the technical effect of safe driving of surrounding vehicles is guaranteed as much as possible.

Figure 3:
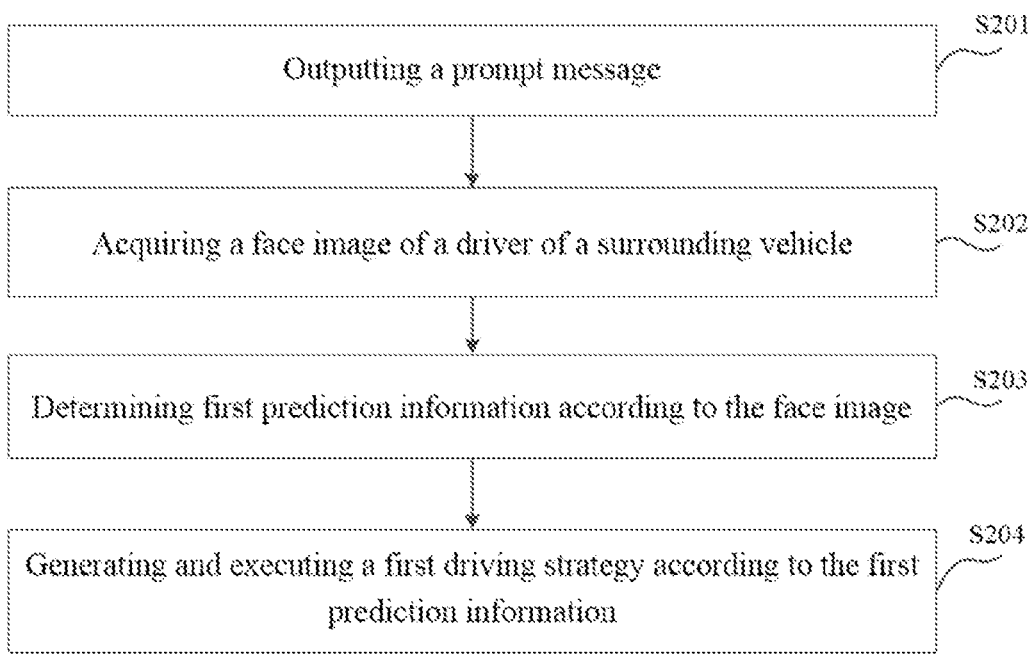
FIG. 3 is a schematic flowchart of a vehicle control method according to another embodiment of the present application.

In order to make readers have a deeper understand the technical solutions and technical effects of controlling safe driving of the host vehicle based on a dimension of the first prediction information in the present application, the vehicle control method in the embodiments of the present application is described in detail with reference to FIG. 3. FIG. 3 is a schematic flowchart of a vehicle control method according to another embodiment of the present application.

As shown in FIG. 3, the method includes:

S201: outputting a prompt message, where the prompt message is used for prompting an intention of lane changing of a host vehicle to a surrounding vehicle, and the surrounding vehicle is a vehicle having a potential influence on the lane changing of the host vehicle.

S101 can be referred to for the description of S201, which will not be repeated here.

S202: acquiring a face image of a driver of the surrounding vehicle, where the face image is used for representing a feedback of the driver on the prompt message.

In combination with the application scenario shown in FIG. 1, and by taking vehicle A2 being the host vehicle and vehicle B2 being the surrounding vehicle as an example, this step is illustratively described:

vehicle A2 acquires the face image of the driver of vehicle B2 for the prompt message after outputting the prompt message.

That is to say, when vehicle A2 outputs the prompt message, the driver of vehicle B2 will make a feedback on the prompt message after seeing the prompt message, such as a change of facial expression and the like, therefore, in this step, the vehicle control apparatus can acquire the face image of the driver of vehicle B2 for the feedback on the prompt message.

It is worth noting that, the above examples are only used for illustratively explaining the solution of acquiring the face image, but cannot be understood as a limitation to a source of the face image. For example, the face image may also be a face image of a driver of vehicle C1 in FIG. 1.

S203: determining first prediction information according to the face image.

This step can be understood as that the vehicle control apparatus predicts whether the driver supports the lane changing of the host vehicle based on the face image to obtain the first prediction information.

It is worth noting that, whether the driver supports the lane changing of the host vehicle is predicted through the face image, so that when it is predicted that the driver supports the lane changing of the host vehicle based on the face image, the vehicle control apparatus executes the lane-changing driving; and when it is predicted that the driver does not support the lane changing of the host vehicle based on the face image, the vehicle control apparatus executes the driving within the current lane, thus avoiding a traffic accident such as a collision between the host vehicle and the surrounding vehicle caused by forcible lane changing in the related art, and realizing technical effects of safe lane changing and improvement of safety and reliability of vehicle driving.

In some embodiments, S203 can include: determining the first prediction information based on the face image and a preset prediction model.

A description of generating the prediction model is as follows:

S2031: collecting training samples, where the training samples include positive sample face images and negative sample face images, the positive sample face images are used for representing face images supporting lane changing and the negative sample face images are used for representing face images not supporting lane changing.

The number of the training samples is not limited in this embodiment, and can be set by the vehicle control apparatus based on training requirements, history records, tests and the like.

For example, for a requirement with relatively high prediction accuracy, the vehicle control apparatus can select a relatively large number of training samples, while for a requirement with relatively low prediction accuracy, the vehicle control apparatus can select a relatively small number of training samples.

S2032: training a basic network model based on the training samples to obtain the prediction model.

Similarly, at least one of a specific type and an architecture of the basic network model is not limited in this embodiment. For example, the basic network model may be any one of a convolution neural network model, a recurrent neural network model, a long-short-term memory neural network model and an adversarial neural network model, and the number of convolution layers and the number of channels are not limited.

That is, the prediction model can be generated by training the basic network model based on the training samples in advance, and the face image is predicted based on the prediction model, so as to generate the first prediction information used for determining whether the driver supports the lane changing of the host vehicle.

S204: generating and executing a first driving strategy according to the first prediction information, where the first driving strategy includes lane-changing driving or driving within the current lane.

It is worth noting that, the basic network model is trained through positive and negative samples, for generating the first prediction information that can predict whether the driver supports the lane changing of the host vehicle. On the one hand, the reliability and accuracy of the prediction for the face image can be improved, thereby accurately acquiring a possibility of whether the driver supports the lane changing of the host vehicle; on the other hand, the vehicle control apparatus can determine and execute the first driving strategy based on the first prediction information, thereby improving safety and accuracy of control of the vehicle control apparatus, and thus improving technical effects of safe driving and less traffic accidents.

Figure 4:
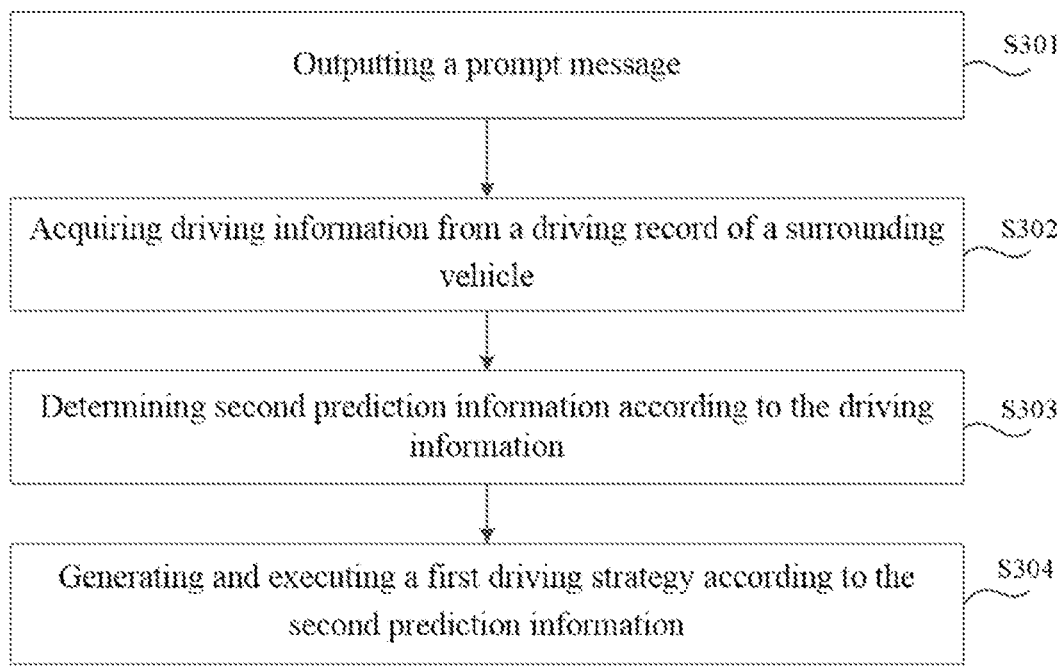
FIG. 4 is a schematic flowchart of a vehicle control method according to another embodiment of the present application.

It can be seen based on the above analysis that, the vehicle control apparatus can also control the safe driving of the host vehicle from a dimension of the second prediction information. Now, in combination with FIG. 4, the technical solutions and technical effects of the vehicle control apparatus controlling the safe driving of the host vehicle based on the dimension of the second prediction information are described in detail. FIG. 4 is a schematic flowchart of a vehicle control method according to another embodiment of the present application.

As shown in FIG. 4, the method includes:

S301: outputting a prompt message, where the prompt message is used for prompting an intention of lane changing of a host vehicle to a surrounding vehicle, and the surrounding vehicle is a vehicle having a potential influence on the lane changing of the host vehicle.

S101 can be referred to for the description of S301, which will not be repeated here.

S302: acquiring driving information from a driving record of the surrounding vehicle, where the driving information is used for representing a feedback of the surrounding vehicle on the prompt message.

In this embodiment, the way in which the vehicle control apparatus determines the driving record is not limited. For example:

In a possible implementation, the host vehicle can be provided with an image collection apparatus (such as a camera), and the vehicle control apparatus can be connected with the image collection apparatus. The image collection apparatus can collect an image of the surrounding vehicle and send the collected image to the vehicle control apparatus. The vehicle control apparatus can generate a driving record based on the image, such as a driving record including a vehicle speed.

In another possible implementation, the host vehicle can be provided with a radar system (such as an ultrasonic radar and a millimeter wave radar, etc.), and the vehicle control apparatus is connected with the radar system. The radar system can measure information of the surrounding vehicle such as a speed and a displacement, generate a driving record, and send the driving record to the vehicle control apparatus.

It is worth noting that, the above examples are only used for illustrative explaining possible ways of determining the driving record in this embodiment, which, however, cannot be understood as a limitation to the way of determining the driving record.

The driving information can be a driving operation for at least one of a speed and a direction executed by the surrounding vehicle for the prompt message after receiving the prompt message output by the host vehicle.

S303: determining second prediction information according to the driving information.

This step can be understood as that the vehicle control apparatus predicts whether the surrounding vehicle supports the lane changing of the host vehicle based on the driving information to obtain the second prediction information.

It is worth noting that, whether the surrounding vehicle supports the lane changing of the host vehicle is predicted through the driving information, so that when it is predicted that the surrounding vehicle supports the lane changing of the host vehicle, the vehicle control apparatus executes lane-changing driving; and when it is predicted that the surrounding vehicle does not support the lane changing of the host vehicle, the vehicle control apparatus executes driving within the current lane, thus avoiding a traffic accident such as a collision between the host vehicle and the surrounding vehicle caused by forcible lane-changing driving in the related art, and realizing technical effects of safe lane changing and improvement of safety and reliability of vehicle driving.

S304: generating and executing a first driving strategy according to the second prediction information, where the first driving strategy includes lane-changing driving or driving within the current lane.

In some embodiments, if the surrounding vehicle is a vehicle located in front of the host vehicle, S303 includes:

if it is determined that the surrounding vehicle is in accelerating driving or constant-speed driving according to the driving information, determining that the second prediction information is information of supporting the lane changing of the host vehicle; and the first driving strategy in S304 is the lane-changing driving.

Accordingly, if it is determined that the surrounding vehicle is in decelerating driving according to the driving information, the vehicle control apparatus determines that the second prediction information is information of not supporting the lane changing of the host vehicle; and the first driving strategy in S304 is the driving within the current lane.

In combination with the above embodiments and the application scenario shown in FIG. 1, vehicle B1 (i.e., the surrounding vehicle) is located in front of vehicle A2 (i.e., the host vehicle). The vehicle control apparatus can determine relevant information of a driving speed of vehicle B1 based on the driving information, and determine whether vehicle B1 is in accelerating driving, or in constant-speed driving, or in decelerating driving according to the information. The vehicle control apparatus can generate second prediction information used for indicating that vehicle B1 supports lane changing of vehicle A2 if the vehicle control apparatus determines that vehicle B1 is in accelerating driving or in constant-speed driving according to the information, and therefore, the vehicle control apparatus can execute the lane-changing driving, that is, control vehicle A2 to change a lane. If the vehicle control apparatus determines that vehicle B1 is in the decelerating driving according to the information, the vehicle control apparatus can generate second prediction information used for indicating that vehicle B1 does not support the lane changing of vehicle A2, and therefore the vehicle control apparatus can control vehicle A2 to drive within the current lane.

It is worth noting that, in this embodiment, when the vehicle control apparatus determines that the second prediction information is information of supporting the lane changing of vehicle A2, vehicle A2 is controlled to change a lane, which can avoid a rear-ending traffic accident of two vehicles caused by decelerating driving of vehicle B1 in the related art, and realize a technical effect of improving safety and reliability of lane changing.

In other embodiments, if the surrounding vehicle is located in a target lane corresponding to the intention of lane changing and behind the host vehicle, S303 includes: if it is determined that the surrounding vehicle is in decelerating driving or constant-speed driving according to the driving information, determining that the second prediction information is information of supporting the lane changing of the host vehicle; and the first driving strategy in S304 is the lane-changing driving.

Accordingly, if it is determined that the surrounding vehicle is in accelerating driving according to the driving information, the vehicle control apparatus determines that the second prediction information is information of not supporting the lane changing of the host vehicle; and the first driving strategy in S304 is the driving within the current lane.

In combination with the above embodiments and the application scenario shown in FIG. 1, vehicle B2 (i.e., the surrounding vehicle) is a vehicle in the target lane and is located behind vehicle A2 (i.e., the host vehicle). The vehicle control apparatus can determine relevant information of a driving speed of vehicle B2 based on the driving information, and determine whether vehicle B2 is in decelerating driving, or in accelerating driving, or in constant-speed driving according to the information. The vehicle control apparatus can generate second prediction information used for indicating that vehicle B2 supports lane changing of vehicle A2 if the vehicle control apparatus determines that vehicle B1 is in decelerating driving or in constant-speed driving according to the information, and therefore, the vehicle control apparatus can control vehicle A2 to change a lane. If the vehicle control apparatus determines that vehicle B2 is in accelerating driving according to the information, the vehicle control apparatus can generate second prediction information used for indicating that vehicle B2 does not support the lane changing of vehicle A2, and therefore the vehicle control apparatus can control vehicle A2 to drive within the current lane.

It is worth noting that, in this embodiment, when the vehicle control apparatus determines that the second prediction information is information of supporting the lane changing of vehicle A2, vehicle A2 is controlled to change a lane, which can avoid a traffic accident of a collision of two vehicles caused by accelerating driving of vehicle B2 in the related art, and realize the technical effect of improving the safety and reliability of lane changing.

In some embodiments, if the surrounding vehicle is located in an adjacent lane of the target lane corresponding to the intention of lane changing, S303 includes:

S3031: determining, according to the driving information, a yaw angle of the surrounding vehicle with the adjacent lane as a reference.

It can be seen based on the above analysis that, the driving information can include information of multiple dimensions, such as information of a speed dimension, information of a displacement dimension and information of a direction dimension, etc. In this step, the vehicle control apparatus can determine the yaw angle according to the driving information, such as determining the yaw angle based on the information of the direction dimension in the driving information.

The yaw angle can be understood as an angle at which the surrounding vehicle deviates from a lane line of the adjacent lane.

In combination with the application scenario shown in FIG. 1, the surrounding vehicle can be either vehicle A1 shown in FIG. 1 or vehicle C1 shown in FIG. 1.

In this embodiment, in order to make readers understand the yaw angle more deeply and avoid repeating the same contents, the yaw angle is illustratively described with reference to FIG. 5 by taking the surrounding vehicle being vehicle C1 as an example.

Figure 5:
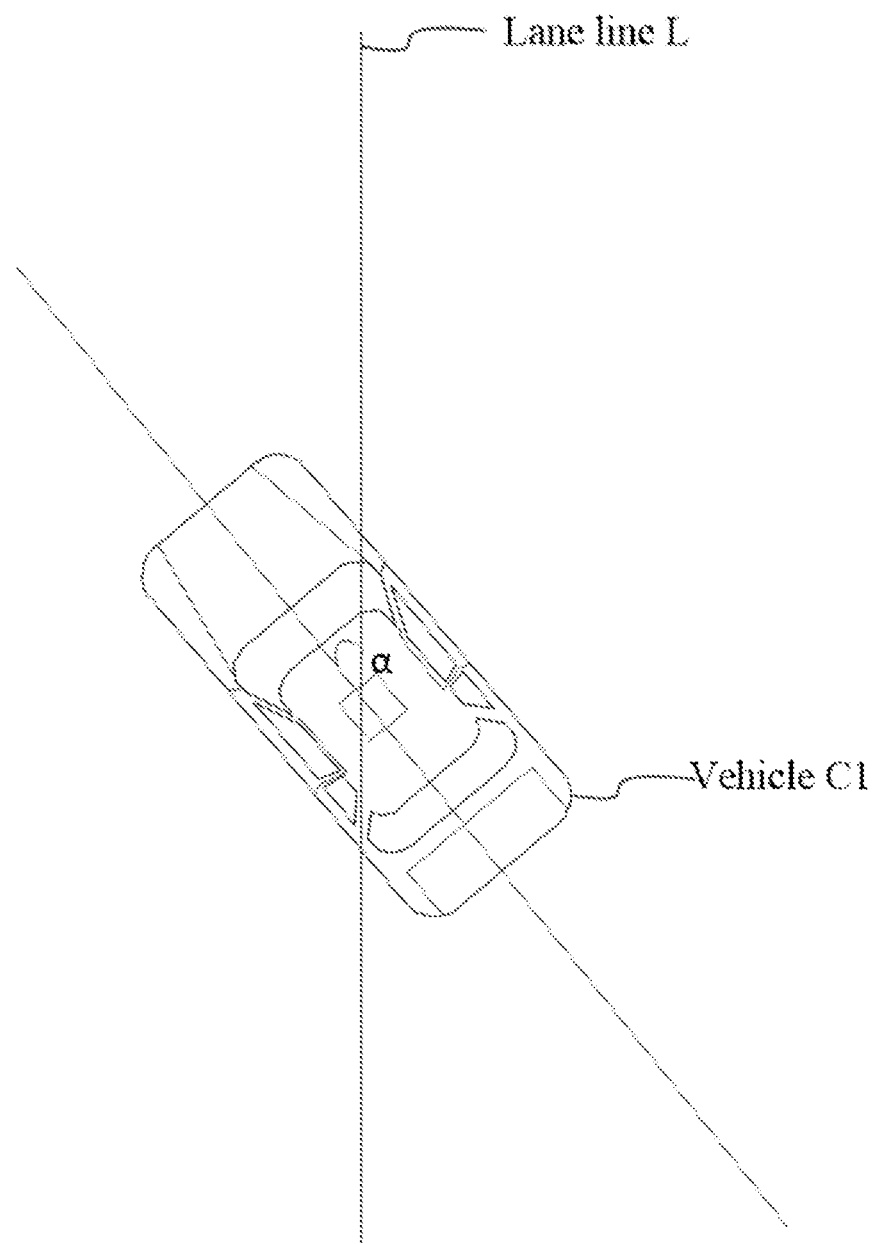
FIG. 5 is a schematic diagram of a yaw angle according to an embodiment of the present application.

As shown in FIG. 5, if a lane line of lane C is lane line L, an included angle $\alpha$ between vehicle C1 and lane line L is the yaw angle.

S3032: determining the second prediction information according to the yaw angle and a preset angle threshold.

That is, in this step, the vehicle control apparatus can determine the second prediction information used for representing whether to support the lane changing of the host vehicle based on the yaw angle and the angle threshold.

The angle threshold can be used for representing a possible included angle between a vehicle when changing a lane and a lane line of its own lane, and the angle threshold can be set by the vehicle control apparatus based on requirements, historical records, tests, etc. which are not limited in this embodiment.

In some embodiments, this step can specifically include: judging, by the vehicle control apparatus, whether the yaw angle is smaller than the angle threshold; if so, determining that the second prediction information is information of supporting the lane changing of the host vehicle, and the first driving strategy in S304 is the lane-changing driving.

Accordingly, if the yaw angle is greater than or equal to the angle threshold, it is determined that the second prediction information is information of not supporting the lane changing of the host vehicle, and the first driving strategy in S304 is the driving within the current lane.

It is worth noting that, in this embodiment, when the vehicle control apparatus determines that the second prediction information is information of supporting the lane changing of vehicle A2, vehicle A2 is controlled to change a lane, which can avoid a traffic accident of a collision of two vehicles caused by lane-changing driving of vehicle C1 in the related art, and realize the technical effect of improving the safety and reliability of lane changing.

It can be seen based on the above analysis that, the vehicle control apparatus can also control the safe driving of the host vehicle from the first prediction information and the second prediction information, so the vehicle control apparatus can assign weight information for the first prediction information and the second prediction information in advance, and after determining the first prediction information and the second prediction information based on the above embodiments, generate and execute the first driving strategy in combination with their corresponding weight information.

For example, the vehicle control apparatus assigns first weight information for the first prediction information and second weight information for the second prediction information; determines a first confidence level corresponding to the first prediction information according to the first prediction information and the first weight information, where the first confidence level can be used for representing a degree of accuracy of the first prediction information, and the higher the first confidence level, the higher the degree of accuracy of the first prediction information; determines a second confidence level corresponding to the second prediction information according to the second prediction information and the second weight information, where the second confidence level can be used for representing a degree of accuracy of the second prediction information, and the higher the second confidence level, the higher the degree of accuracy of the second prediction information; generating and executing the first driving strategy according to the first confidence level and the second confidence level.

The generating and executing the first driving strategy according to the first confidence level and the second confidence level use any of the following ways:
  if the first confidence level is greater than the second confidence level, generating and executing the first driving strategy with the first prediction information;
  if the first confidence level is smaller than the second confidence level, generating and executing the first driving strategy with the second prediction information;
  if the first confidence level is equal to the second confidence level, randomly selecting the first prediction information or the second prediction information to generate and execute the first driving strategy.

It can be seen based on the above analysis that, the first driving strategy can be lane-changing driving or driving within the current lane. When the prediction information is used for representing supporting for the lane changing of the host vehicle, the first driving strategy can be lane-changing driving; and when the prediction information is used for representing not supporting for the lane changing of the host vehicle, the first driving strategy can be driving within the current lane.

In some embodiments, driving within the current lane can include: driving with a current state being maintained, or yaw driving by taking a direction of the target lane corresponding to the intention of lane changing as a target direction.

That is to say, driving within the current lane can includes two ways, one is driving with the current state being maintained, and the other is yaw driving.

Of course, driving within the current lane can also include accelerating driving and decelerating driving, etc.

Figure 6:
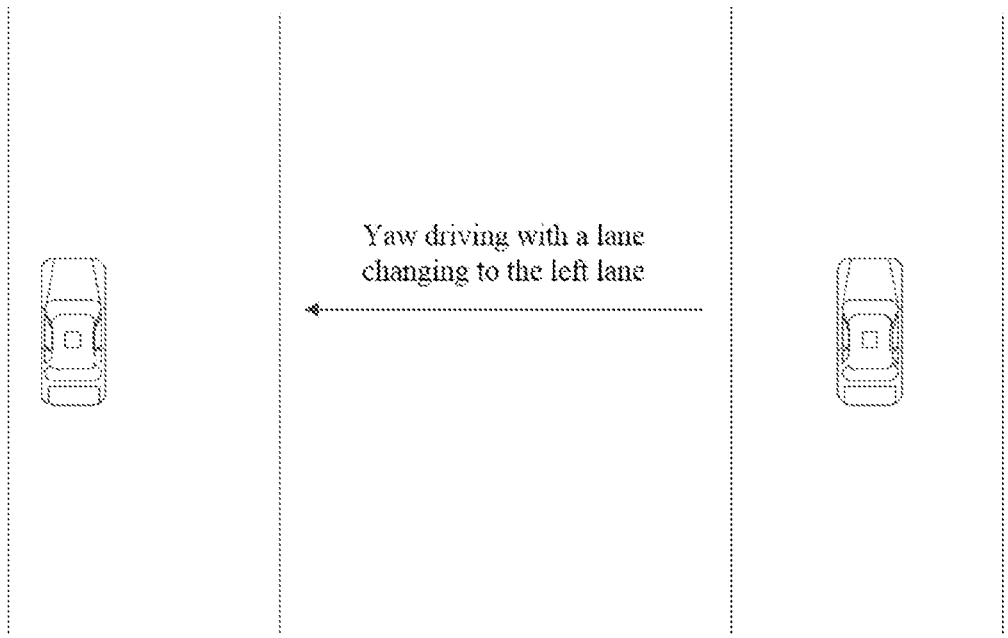
FIG. 6 is a schematic diagram of yaw driving according to an embodiment of the present application.
Figure 7:
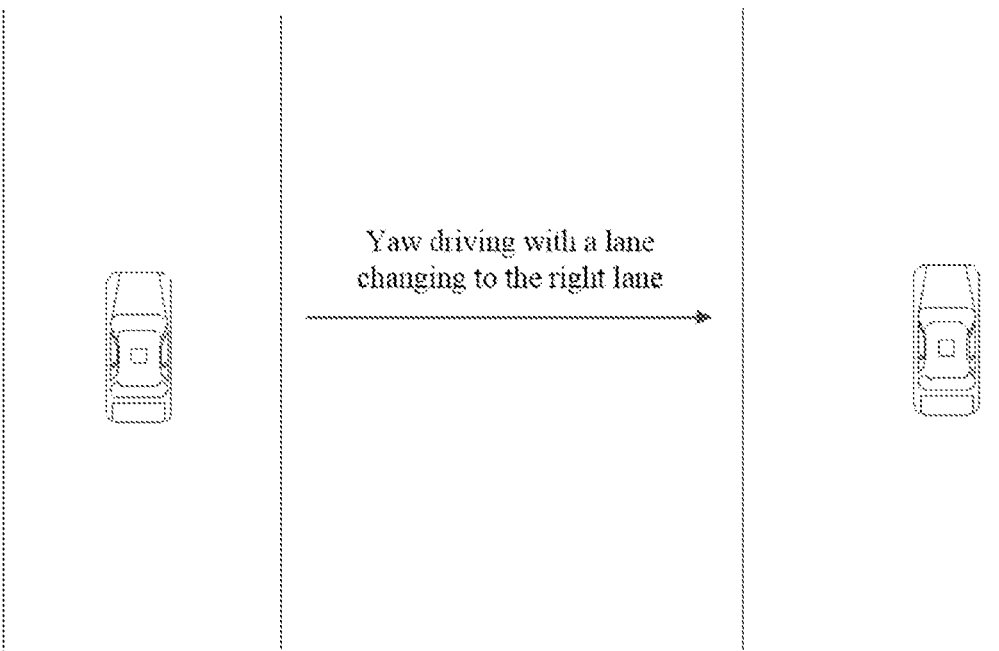
FIG. 7 is a schematic diagram of yaw driving according to another embodiment of the present application.

For example, if the intention of lane changing of the host vehicle is to change a lane to a left lane (based on the lane where the host vehicle is currently located), FIG. 6 can be referred to for an effect of yaw driving executed by the vehicle control apparatus; if the intention of lane changing of the host vehicle is to change a lane to a right lane (based on the lane where the host vehicle is currently located), FIG. 7 can be referred to for an effect of yaw driving executed by the vehicle control apparatus.

It is worth noting that, when the vehicle control apparatus determines that the surrounding vehicle does not support the lane changing of the host vehicle, driving with the current state being maintained or yaw driving can be executed, which can realize diversity and flexibility of controlling the driving of the host vehicle.

Figure 8:
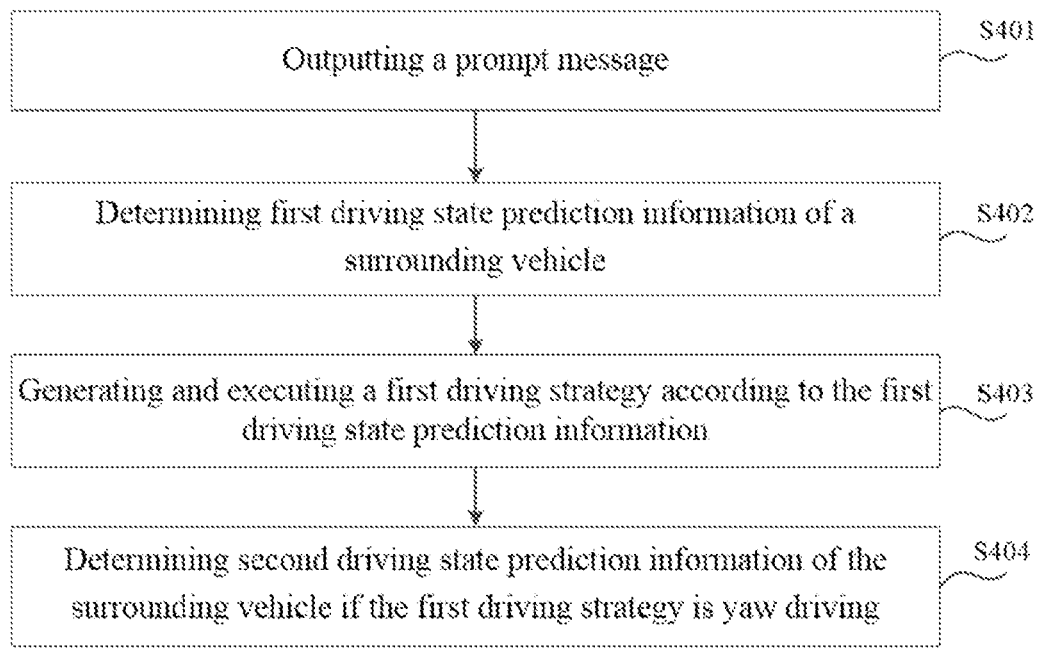
FIG. 8 is a schematic flowchart of a vehicle control method according to another embodiment of the present application.

In some embodiments, when the first driving strategy is yaw driving, it can be understood that after the host vehicle fails to change a lane, the vehicle control apparatus outputs the information prompting the intention of lane changing of the host vehicle again, so as to complete lane changing of the host vehicle. In order to make readers understand the solution of this embodiment more deeply, this embodiment is described in detail with reference to FIG. 8. FIG. 8 is a schematic flowchart of a vehicle control method according to another embodiment of the present application.

As shown in FIG. 8, the method includes:
  S401: outputting a prompt message, where the prompt message is used for prompting an intention of lane changing of a host vehicle to a surrounding vehicle, and the surrounding vehicle is a vehicle having a potential influence on the lane changing of the host vehicle.
  S402: determining first driving state prediction information of the surrounding vehicle, where the first driving state prediction information is related to a feedback on the prompt message.
  S403: generating and executing a first driving strategy according to the first driving state prediction information.

The above embodiments can be referred to for the description of S401 to S403, which will not be repeated here.

S404: if the first driving strategy is yaw driving, determining second driving state prediction information of the surrounding vehicle, where the second driving state prediction information is related to a feedback on the yaw driving.

The description of the first driving state prediction information can be referred to for a determination method of the second driving state prediction information, which will not be repeated here.

S405: generating and executing a second driving strategy according to the second driving state prediction information, where the second driving strategy includes lane-changing driving or driving with the current state being maintained.

That is, when the vehicle control apparatus determines that the surrounding vehicle does not support the lane changing of the host vehicle, yaw driving can be executed to enhance the intention of lane changing of the host vehicle. The host vehicle can determine whether the surrounding vehicle supports the lane changing of the host vehicle after enhancing the intention of lane changing based on the feedback on the yaw driving. If so (i.e. supporting), lane-changing driving is executed; if not (i.e. not supporting), driving with the current state being maintained is executed.

It is worth noting that, in this embodiment, whether the surrounding vehicle supports the lane changing of the host vehicle is determined again by enhancing the intention of lane changing, which can improve a success rate of lane changing, that is, satisfy a user's requirement of lane changing, and ensure the technical effect of safety and reliability of lane changing.

It should be noted that, in some embodiments, the vehicle control apparatus can acquire a distance for lane changing, and when the distance for lane changing satisfies a requirement of lane changing, for example, when the distance for lane changing is greater than a threshold of a distance for safe lane changing as described in the above embodiments, the vehicle control apparatus generates and outputs the prompt message.

In other embodiments, the vehicle control apparatus may acquire the distance for lane changing when the first driving strategy is lane-changing driving. When the distance for lane changing satisfies the requirement of lane changing, for example, when the distance for lane changing is greater than the threshold of the distance for safe lane changing as described in the above embodiments, the vehicle control apparatus executes lane-changing driving.

According to another aspect of the embodiments of the present application, an embodiment of the present application also provides a vehicle control apparatus, configured to execute the vehicle control method described in any one of the above embodiments, such as execute the vehicle control method shown in any one of the embodiments in FIG. 2, FIG. 3, FIG. 4 and FIG. 8.

Figure 9:
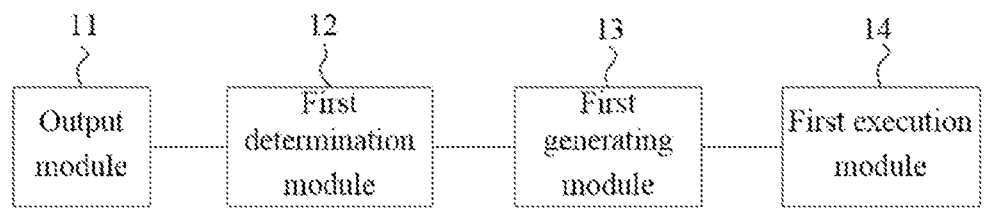
FIG. 9 is a schematic diagram of a vehicle control apparatus according to an embodiment of the present application.

Please refer to FIG. 9, FIG. 9 is a schematic diagram of a vehicle control apparatus according to an embodiment of the present application.

As shown in FIG. 9, the apparatus includes:
an output module 11, configured to output a prompt message, where the prompt message is used for prompting an intention of lane changing of a host vehicle to a surrounding vehicle, and the surrounding vehicle is a vehicle having a potential influence on the lane changing of the host vehicle;
a first determination module 12, configured to determine first driving state prediction information of the surrounding vehicle, where the first driving state prediction information is related to a feedback on the prompt message;
a first generating module 13, configured to generate a first driving strategy according to the first driving state prediction information, where the first driving strategy includes lane-changing driving or driving within a current lane;
a first execution module 14, configured to execute the first driving strategy.

In some embodiments, the first driving state prediction information includes: at least one of first prediction information determined based on driver information and second prediction information determined based on a driving record.

Figure 10:
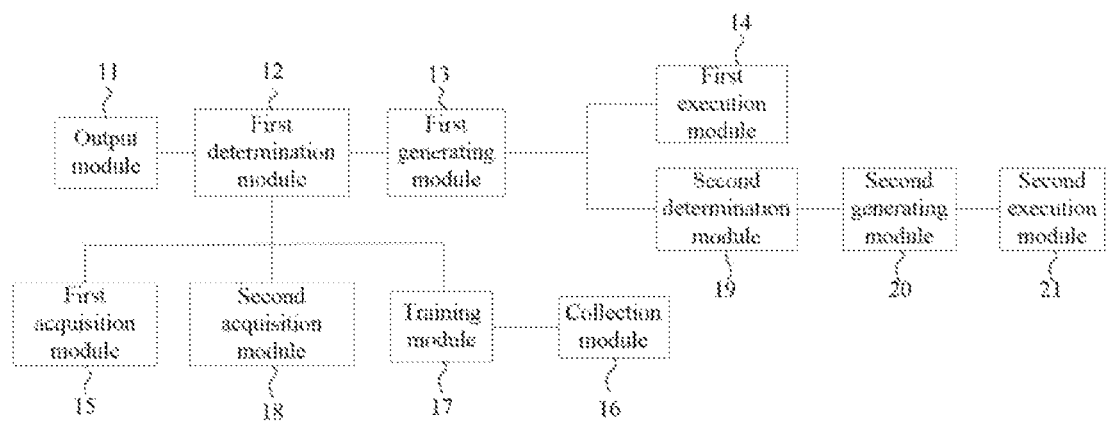
FIG. 10 is a schematic diagram of a vehicle control apparatus according to another embodiment of the present application.

It can be seen in combination with FIG. 10 that in some embodiments, if the first driving state prediction information includes the first prediction information determined based on the driver information, the apparatus further includes:

a first acquisition module 15, configured to acquire a face image of a driver of the surrounding vehicle, where the face image is used for representing a feedback of the driver on the prompt message;
and the first determination module 12 is configured to determine the first prediction information according to the face image.

It can be seen in combination with FIG. 10 that in some embodiments, the apparatus further includes:
a collection module 16, configured to collect training samples, where the training samples include positive sample face images and negative sample face images, the positive sample face images are used for representing face images supporting lane changing and the negative sample face images are used for representing face images not supporting lane changing;
a training module 17, configured to train a basic network model based on the training samples to obtain a prediction model;
and the first determination module 12 is configured to determine the first prediction information according to the face image and the prediction model.

It can be seen in combination with FIG. 10 that in some embodiments, if the first driving state prediction information includes the second prediction information determined based on the driving record, the apparatus further includes:
a second acquisition module 18, configured to acquire driving information from the driving record, where the driving information is used for representing the feedback of the surrounding vehicle on the prompt message;
and the first determination module 12 is configured to determine the second prediction information according to the driving information.

In some embodiments, if the surrounding vehicle is a vehicle located in front of the host vehicle, the first determination module 12 is configured to, if it is determined that the surrounding vehicle is in accelerating driving or in constant-speed driving according to the driving information, determine that the second prediction information is information of supporting the lane changing of the host vehicle, and the first driving strategy is lane-changing driving.

In some embodiments, if the surrounding vehicle is located in a target lane corresponding to the intention of lane changing and behind the host vehicle, the first determination module 12 is configured to, if it is determined that the surrounding vehicle is in decelerating driving or in constant-speed driving according to the driving information, determine that the second prediction information is information of supporting the lane changing of the host vehicle, and the first driving strategy is lane-changing driving.

In some embodiments, if the surrounding vehicle is located in an adjacent lane of the target lane corresponding to the intention of lane changing, the first determination module 12 is configured to determine, according to the driving information, a yaw angle of the surrounding vehicle with the adjacent lane as a reference, and determine the second prediction information according to the yaw angle and a preset angle threshold.

In some embodiments, the driving within the current lane includes: driving with the current state being maintained, or yaw driving by taking a direction of the target lane corresponding to the intention of lane changing as a target direction.

It can be seen in combination with FIG. 10 that in some embodiments, if the driving within the current lane is the yaw driving, the apparatus further includes:

a second determination module 19, configured to determine second driving state prediction information of the surrounding vehicle, where the second driving state prediction information is related to a feedback on the yaw driving;

a second generating module 20, configured to generate a second driving strategy according to the second driving state prediction information, where the second driving strategy includes lane-changing driving or driving within the current lane;

a second execution module 21, configured to execute the second driving strategy.

According to another aspect of the embodiments of the present application, an embodiment of the present application also provides a vehicle, including the vehicle control apparatus described in any one of the above embodiments, such as the vehicle control apparatus shown in FIG. 9 or FIG. 10.

In some embodiments, the vehicle further includes:

an image collection apparatus, where the image collection apparatus is configured to collect a face image of a driver of the surrounding vehicle and send the face image to the vehicle control apparatus, where the face image is used for generating first prediction information.

In some embodiments, the image collection apparatus is configured to collect an image of the surrounding vehicle and send the collected image to the vehicle control apparatus;

the vehicle control apparatus is configured to generate a driving record of the surrounding vehicle according to the received image.

In some embodiments, the vehicle further includes:

a radar system, configured to collect driving information of the surrounding vehicle and send the driving information to the vehicle control apparatus, where the driving information is used for generating the driving record.

Of course, in other embodiments, the driving record can also be generated by radar system based on the driving information and sent to the vehicle control apparatus, which is not limited in this embodiment.

According to embodiments of the present application, the present application also provides an electronic device and a readable storage medium.

Figure 11:
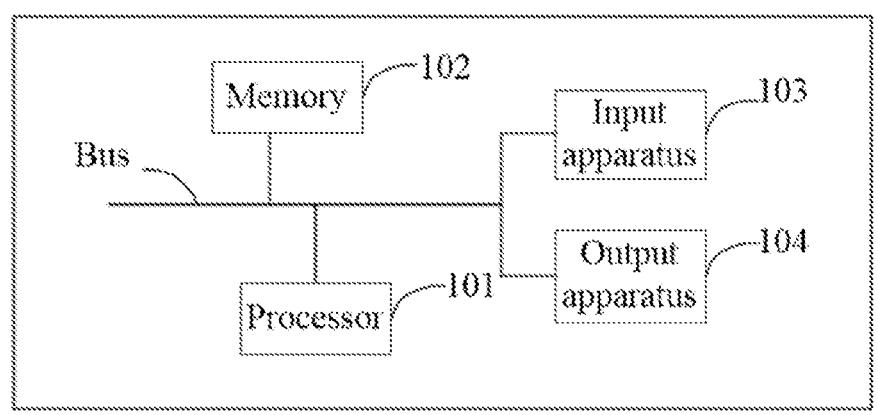
FIG. 11 is a block diagram of an electronic device according to an embodiment of the present application.

As shown in FIG. 11, FIG. 11 is a block diagram of an electronic device according to an embodiment of the present application. The electronic device is intended to represent various forms of digital computers, such as a laptop computer, a desktop computer, a workstation, a personal digital assistant, a server, a blade server, a mainframe computer, and other suitable computers. The electronic device can also represent various forms of mobile devices, such as a personal digital assistant, a cellular phone, a smart phone, a wearable devices and other similar computing devices. The components shown herein, connections and relationships between them, and functions thereof are merely examples, and are not intended to limit the implementation of the embodiments of the present application described and/or claimed herein.

As shown in FIG. 11, the electronic device includes one or more processors 101, a memory 102, and interfaces used for connecting to various components including a high-speed interface and a low-speed interface. The components are connected with each other by different buses, and can be mounted on a common main board or in other ways as needed. The processor may process instructions, including instructions stored in or on the memory to display graphical information of a GUI (Graphical User Interface) on an external input/output apparatus (such as a display device coupled to an interface), executed within the electronic device. In other implementations, multiple processors and/or multiple buses may be used together with multiple memories, if needed. Similarly, multiple electronic devices can be connected, and each device provides some necessary operations (for example, as a server array, a group of blade servers, or a multiprocessor system). In FIG. 11, one processor 101 is taken as an example.

The memory 102 is the non-transitory computer-readable storage medium provided by the embodiments of the present application. The memory stores instructions executable by at least one processor to cause the at least one processor to execute the vehicle control method provided by the embodiments of the present application. The non-transitory computer-readable storage medium of the embodiments of the present application stores computer instructions, and computer instructions are used for causing a computer to execute the vehicle control method provided by the embodiments of the present application.

As a non-transitory computer-readable storage medium, the memory 102 can be configured to store non-transitory software programs, non-transitory computer executable programs and modules, such as program instructions/modules in the embodiments of the present application. The processor 101 executes various functional applications and data processing of a server by running non-transitory software programs, instructions and modules stored in the memory 102, that is, realizes the vehicle control method in the above method embodiments.

The memory 102 may include a program storing area and a data storing area, where the program storing area may store an operating system, an application program required by at least one function; the data storing area may store data created by the use of the electronic device, etc. In addition, the memory 102 may include a high-speed random access memory, and may also include a non-transitory memory, such as at least one disk memory device, a flash memory device, or other non-transitory solid-state memory devices. In some embodiments, the memory 102 may optionally include memories remotely located with respect to the processor 101, and these remote memories may be connected to the electronic device through a network. Examples of the network include, but are not limited to, the Internet, an intranet, a local area network, a block-chain-based service network (BSN), a mobile communication network and combinations thereof.

The electronic device may further include: an input apparatus 103 and an output apparatus 104. The processor 101, the memory 102, the input apparatus 103, and the output apparatus 104 may be connected through a bus or other means. A connection through a bus is taken as an example in FIG. 11.

The input apparatus 103 can receive inputted digital or character information, and generate a key signal input related to user setting and function control of the electronic device, such as a touch screen, a keypad, a mouse, a track pad, a touch pad, an indicator stick, one or more mouse buttons, a trackball, a joystick and other input apparatuses. The output apparatus 104 may include a display device, an auxiliary lighting apparatus (e.g., an LED), a tactile feedback device (e.g., a vibration motor), etc. The display device may include, but is not limited to, a liquid crystal display (LCD), a light emitting diode (LED) display, and a plasma display. In some embodiments, the display device may be a touch screen.

The various implementations of the systems and techniques described herein may be implemented in digital electronic circuit systems, integrated circuit systems, dedicated ASIC (application specific integrated circuits), computer hardware, firmware, software, and/or combinations thereof. These various implementations may include: being implemented in one or more computer programs, where the one or more computer programs can be executed and/or interpreted on a programmable system including at least one programmable processor, and the programmable processor may be a dedicated or general programmable processor, and can receive data and instructions from a storage system, at least one input apparatus, and at least one output apparatus, and transmit data and instructions to the storage system, the at least one input apparatus, and the at least one output apparatus.

These computer programs (also called programs, software, software applications, or codes) include machine instructions of programmable processors, and can be implemented using high-level procedures and/or object-oriented programming languages, and/or assembly/machine languages. As used herein, the terms "machine-readable medium" and "computer-readable medium" refer to any computer program product, device, and/or apparatus (e.g., a magnetic disk, an optical disk, a memory, a programmable logic device (PLD)) used for providing machine instructions and/or data to a programmable processor, including a machine-readable medium that receives machine instructions as machine-readable signals. The term "machine-readable signal" refers to any signal used for providing machine instructions and/or data to a programmable processor.

To provide interaction with a user, the systems and techniques described herein can be implemented on a computer, where the computer has: a display device (e.g., a CRT (cathode ray tube) or LCD (liquid crystal display) monitor) used for displaying information to the user; and a keyboard and a pointing apparatus (e.g., a mouse or a trackball), through which the user can provide inputs to the computer. Other kinds of apparatuses can also be used for providing interaction with the user; for example, a feedback provided to the user can be any form of sensory feedback (such as, visual feedback, auditory feedback, or tactile feedback); and can receive inputs from the user in any form (including acoustic input, voice input or tactile input).

The systems and techniques described herein can be implemented in a computing system including background components (e.g., as a data server), or a computing system including middleware components (e.g., an application server), or a computing system including front-end components (e.g., a user computer with a graphical user interface or a web browser through which the user can interact with implementations of the systems and techniques described herein), or a computing system including any combination of such background components, middleware components, or front-end components. Components of the system can be connected with each other through digital data communication in any form or medium (e.g., a communication network). Examples of the communication network include: a local area network (LAN), a block-chain-based service network (BSN), a wide area network (WAN) and the Internet.

A computer system may include a client and a server. The client and the server are generally remote from each other and usually interact through a communication network. A relationship between the client and the server is generated by computer programs running on corresponding computers and having a client-server relationship with each other.

It should be understood that, steps can be reordered, added or deleted for the various forms of processes shown above. For example, the steps described in the present application can be executed in parallel, or in sequence or in a different order, so long as the desired result of the technical solutions of the present application can be realized, which is not limited here.

The above specific implementations do not constitute a limitation on the protection scope of the present application. It should be understood by those skilled in the art that, various modifications, combinations, sub-combinations and substitutions can be made according to design requirements and other factors. Any modification, equivalent substitution, improvement and others that are made within the spirit and principle of the present application should be contained in the protection scope of the present application.

What is claimed is:

1. A vehicle control method, comprising:
   outputting a prompt message, wherein the prompt message is configured to prompt an intention of lane changing of a host vehicle to a surrounding vehicle, and the surrounding vehicle is a vehicle having a potential influence on the lane changing of the host vehicle;
   determining first driving state prediction information of the surrounding vehicle, wherein the first driving state prediction information is related to a feedback on the prompt message, wherein the first driving state prediction information comprises first prediction information determined based on driver information and second prediction information determined based on a driving record; and
   generating and executing a first driving strategy according to the first driving state prediction information, wherein the first driving strategy comprises lane-changing driving or driving within a current lane;
   wherein the method further comprises: acquiring a face image of a driver of the surrounding vehicle, wherein the face image represents a feedback of the driver on the prompt message;
   and the determining the first driving state prediction information of the surrounding vehicle comprises: determining the first prediction information according to the face image;
   wherein the method further comprises: collecting training samples, wherein the training samples comprise positive sample face images and negative sample face images, the positive sample face images represent face images supporting lane changing and the negative sample face images represent face images not supporting lane changing; training a basic network model based on the training samples to obtain a prediction model;
   and the determining the first prediction information according to the face image comprises: determining the first prediction information according to the face image and the prediction model.

2. The method according to claim 1, further comprising:
   acquiring driving information from the driving record, wherein the driving information represents a feedback of the surrounding vehicle on the prompt message;
   and the determining the first driving state prediction information of the surrounding vehicle comprises:

determining the second prediction information according to the driving information.

3. The method according to claim 2, wherein, if the surrounding vehicle is a vehicle located in front of the host vehicle, the determining the second prediction information according to the driving information comprises: if it is determined that the surrounding vehicle is in accelerating driving or in constant-speed driving according to the driving information, determining that the second prediction information is information of supporting the lane changing of the host vehicle; and the first driving strategy is the lane-changing driving.

4. The method according to claim 2, wherein if the surrounding vehicle is located in a target lane corresponding to the intention of lane changing and behind the host vehicle, the determining the second prediction information according to the driving information comprises:
if it is determined that the surrounding vehicle is in decelerating driving or in constant-speed driving according to the driving information, determining that the second prediction information is information of supporting the lane changing of the host vehicle;
and the first driving strategy is the lane-changing driving.

5. The method according to claim 2, wherein if the surrounding vehicle is located in an adjacent lane of a target lane corresponding to the intention of lane changing, the determining the second prediction information according to the driving information comprises:
determining, according to the driving information, a yaw angle of the surrounding vehicle with the adjacent lane as a reference; and
determining the second prediction information according to the yaw angle and a preset angle threshold.

6. The method according to claim 1, wherein the driving within the current lane comprises: driving with a current state being maintained, or yaw driving by taking a direction of a target lane corresponding to the intention of lane changing as a target direction.

7. The method according to claim 6, wherein if the driving within the current lane is the yaw driving, the method further comprises:
determining second driving state prediction information of the surrounding vehicle, wherein the second driving state prediction information is related to a feedback on the yaw driving; and
generating and executing a second driving strategy according to the second driving state prediction information, wherein the second driving strategy comprises the lane-changing driving or the driving within the current lane.

8. The method according to claim 1, further comprising:
assigning first weight information for the first prediction information and assigning second weight information for the second prediction information;
wherein the generating and executing the first driving strategy according to the first driving state prediction information comprises: determining a first confidence level corresponding to the first prediction information according to the first prediction information and the first weight information, wherein the first confidence level represents a degree of accuracy of the first prediction information;
determining a second confidence level corresponding to the second prediction information according to the second prediction information and the second weight information, wherein the second confidence level represents a degree of accuracy of the second prediction information; and
generating and executing the first driving strategy according to the first confidence level and the second confidence level.

9. The method according to claim 8, wherein the generating and executing the first driving strategy according to the first confidence level and the second confidence level comprises any of following ways:
if the first confidence level is greater than the second confidence level, generating and executing the first driving strategy with the first prediction information;
if the first confidence level is smaller than the second confidence level, generating and executing the first driving strategy with the second prediction information;
if the first confidence level is equal to the second confidence level, selecting the first prediction information or the second prediction information as the first driving state prediction information to generate and execute the first driving strategy.

10. The method according to claim 1, further comprising:
acquiring a distance for lane changing; and
when the distance for lane changing is greater than a threshold of a distance for safe lane changing, generating and outputting the prompt message.

11. A vehicle control apparatus, comprising:
at least one processor; and
a memory communicatively connected with the at least one processor; wherein,
the memory stores instructions executable by the at least one processor, and the instructions are executed by the at least one processor, so that the at least one processor is configured to:
output a prompt message, wherein the prompt message is configured to prompt an intention of lane changing of a host vehicle to a surrounding vehicle, and the surrounding vehicle is a vehicle having a potential influence on the lane changing of the host vehicle;
determine first driving state prediction information of the surrounding vehicle, wherein the first driving state prediction information is related to a feedback on the prompt message, wherein the first driving state prediction information comprises first prediction information determined based on driver information and second prediction information determined based on a driving record;
generate a first driving strategy according to the first driving state prediction information, wherein the first driving strategy comprises lane-changing driving or driving within a current lane;
and execute the first driving strategy;
wherein the at least one processor is further configured to:
acquire a face image of a driver of the surrounding vehicle, wherein the face image represents a feedback of the driver on the prompt message; and determine the first prediction information according to the face image;
wherein the at least one processor is further configured to:
collect training samples, wherein the training samples comprise positive sample face images and negative sample face images, the positive sample face images represent face images supporting lane changing and the negative sample face images represent face images not supporting lane changing; train a basic network model based on the training samples to obtain a prediction model; and determine the first prediction information according to the face image and the prediction model.

12. The apparatus according to claim 11, wherein the at least one processor is further configured to:
acquire driving information from the driving record, wherein the driving information represents a feedback of the surrounding vehicle on the prompt message; and determine the second prediction information according to the driving information.

13. The apparatus according to claim 12, wherein: if the surrounding vehicle is a vehicle located in front of the host vehicle, the at least one processor is configured to, if it is determined that the surrounding vehicle is in accelerating driving or in constant-speed driving according to the driving information, determine that the second prediction information is information of supporting the lane changing of the host vehicle, and the first driving strategy is the lane-changing driving;
if the surrounding vehicle is located in a target lane corresponding to the intention of lane changing and behind the host vehicle, the at least one processor is configured to, if it is determined that the surrounding vehicle is in decelerating driving or in constant-speed driving according to the driving information, determine that the second prediction information is information of supporting the lane changing of the host vehicle, and the first driving strategy is the lane-changing driving;
if the surrounding vehicle is located in an adjacent lane of a target lane corresponding to the intention of lane changing, the at least one processor is configured to determine, according to the driving information, a yaw angle of the surrounding vehicle with the adjacent lane as a reference, and determine the second prediction information according to the yaw angle and a preset angle threshold.

14. A vehicle, comprising: the vehicle control apparatus according to claim 11.

15. The apparatus according to claim 11, wherein the driving within the current lane comprises: driving with a current state being maintained, or yaw driving by taking a direction of a target lane corresponding to the intention of lane changing as a target direction.

16. The apparatus according to claim 15, wherein if the driving within the current lane is the yaw driving, the at least one processor is further configured to:
determine second driving state prediction information of the surrounding vehicle, wherein the second driving state prediction information is related to a feedback on the yaw driving; and
generate and execute a second driving strategy according to the second driving state prediction information, wherein the second driving strategy comprises the lane-changing driving or the driving within the current lane.

17. The apparatus according to claim 11, wherein the at least one processor is further configured to:
assign first weight information for the first prediction information and assign second weight information for the second prediction information;
and determine a first confidence level corresponding to the first prediction information according to the first prediction information and the first weight information, wherein the first confidence level represents a degree of accuracy of the first prediction information;
determine a second confidence level corresponding to the second prediction information according to the second prediction information and the second weight information, wherein the second confidence level represents a degree of accuracy of the second prediction information; and
generate and execute the first driving strategy according to the first confidence level and the second confidence level.

18. The apparatus according to claim 17, wherein the at least one processor is further configured to:
if the first confidence level is greater than the second confidence level, generate and execute the first driving strategy with the first prediction information;
if the first confidence level is smaller than the second confidence level, generate and execute the first driving strategy with the second prediction information;
if the first confidence level is equal to the second confidence level, select the first prediction information or the second prediction information as the first driving state prediction information to generate and execute the first driving strategy.

19. The apparatus according to claim 11, wherein the at least one processor is further configured to:
acquire a distance for lane changing; and
when the distance for lane changing is greater than a threshold of a distance for safe lane changing, generate and output the prompt message.

20. A non-transitory computer-readable storage medium storing computer instructions, wherein the computer instructions are configured to cause a computer to execute following steps:
outputting a prompt message, wherein the prompt message is configured to prompt an intention of lane changing of a host vehicle to a surrounding vehicle, and the surrounding vehicle is a vehicle having a potential influence on the lane changing of the host vehicle;
determining first driving state prediction information of the surrounding vehicle, wherein the first driving state prediction information is related to a feedback on the prompt message, wherein the first driving state prediction information comprises first prediction information determined based on driver information and second prediction information determined based on a driving record; and
generating and executing a first driving strategy according to the first driving state prediction information, wherein the first driving strategy comprises lane-changing driving or driving within a current lane;
wherein the computer instructions are configured to cause the computer to further execute following steps: acquiring a face image of a driver of the surrounding vehicle, wherein the face image represents a feedback of the driver on the prompt message; and determining the first prediction information according to the face image;
wherein the computer instructions are configured to cause the computer to further execute following steps: collecting training samples, wherein the training samples comprise positive sample face images and negative sample face images, the positive sample face images represents face images supporting lane changing and the negative sample face images represents face images not supporting lane changing; train a basic network model based on the training samples to obtain a prediction model; and determining the first prediction information according to the face image and the prediction model.

* * * * *